(12) United States Patent
Cha et al.

(10) Patent No.: US 7,023,673 B2
(45) Date of Patent: Apr. 4, 2006

(54) SUPERCONDUCTING SHIELDED CORE REACTOR WITH REDUCED AC LOSSES

(75) Inventors: Yung S. Cha, Darien, IL (US); John R. Hull, Downers Grove, IL (US)

(73) Assignee: The University of Chicago, Chicago, IL (US)

( * ) Notice: Subject to any disclaimer, the term of this patent is extended or adjusted under 35 U.S.C. 154(b) by 472 days.

(21) Appl. No.: 10/328,324

(22) Filed: Dec. 23, 2002

(65) Prior Publication Data

US 2004/0120083 A1    Jun. 24, 2004

(51) Int. Cl.
   *H01H 47/00*     (2006.01)
(52) U.S. Cl. ......................................... 361/19; 361/141
(58) Field of Classification Search .................. 361/10, 361/11, 19, 78, 87, 93, 139, 141, 143; 335/216, 335/299, 300
See application file for complete search history.

(56) References Cited

U.S. PATENT DOCUMENTS 4,926,289 A * 5/1990 Reichert ..................... 361/141
5,475,560 A * 12/1995 Onishi et al. ................ 361/141
5,600,522 A * 2/1997 Hull .............................. 361/19
5,694,279 A * 12/1997 Mumford ...................... 361/19
5,892,644 A    4/1999 Evans et al.
5,930,095 A * 7/1999 Joo et al. ....................... 361/58

* cited by examiner

*Primary Examiner*—Brian Sircus
*Assistant Examiner*—Danny Nguyen
(74) *Attorney, Agent, or Firm*—Emrich & Dithmar LLC

(57) ABSTRACT

A superconducting shielded core reactor (SSCR) operates as a passive device for limiting excessive AC current in a circuit operating at a high power level under a fault condition such as shorting. The SSCR includes a ferromagnetic core which may be either closed or open (with an air gap) and extends into and through a superconducting tube or superconducting rings arranged in a stacked array. First and second series connected copper coils each disposed about a portion of the iron core are connected to the circuit to be protected and are respectively wound inside and outside of the superconducting tube or rings. A large impedance is inserted into the circuit by the core when the shielding capability of the superconducting arrangement is exceeded by the applied magnetic field generated by the two coils under a fault condition to limit the AC current in the circuit. The proposed SSCR also affords reduced AC loss compared to conventional SSCRs under continuous normal operation.

17 Claims, 1 Drawing Sheet

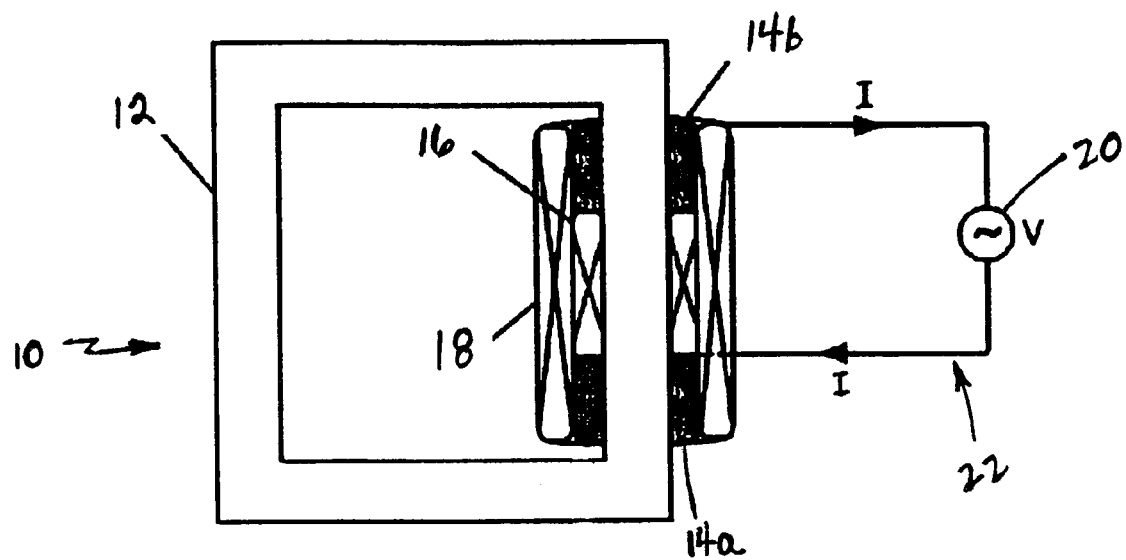

SUPERCONDUCTING SHIELDED CORE REACTOR WITH REDUCED AC LOSSES

CONTRACTUAL ORIGIN OF THE INVENTION

The United States Government has rights in this invention to Contract No. W-31-109-ENG-38 between the U.S. Department of Energy and the University of Chicago representing Argonne National Laboratory.

FIELD OF THE INVENTION

This invention relates generally to fault current limiters (FCLs) in a high power application to limit excessive electrical current in a fault condition such as in an electrical distribution and transmission system and is particularly directed to the reduction of AC losses in a superconductor shielded core reactor (SSCR) as used as an FCL in an electrical distribution and transmission system under continuous normal operating conditions.

BACKGROUND OF THE INVENTION

A fault current limiter (FCL) is an active or passive device used at high power levels for limiting excessive current in an electric circuit during a fault condition, such as shorting. The purpose of the FCL is to limit damage to electrical distribution equipment which would otherwise be damaged or destroyed by a sudden fault such as a lightning strike. An FCL operates by inserting a fixed, or predetermined, impedance into a circuit under fault conditions to limit the current.

One example of an FCL is a superconducting shielded core reaction (SSCR), which is a passive device consisting mainly of a closed iron core disposed within a superconducting tube around which is wound a copper coil. The copper coil is electrically connected to the circuit that is to be protected by the SSCR under fault conditions. The shielding capability of the superconducting tube keeps the inductance low under normal operating conditions. Under fault conditions, the large current in the copper coil exceeds the shielding capability of the superconducting tube resulting in a large, sudden increase in impedance because the iron core is no longer shielded from the copper coil by the superconducting tube. The electrical performance of SSCRs is well documented in the literature.

Because the FCL and SSCR are used primarily in electrical transmission and distribution systems, they are subject to alternating current (AC) losses. It is well known that a superconductor is not entirely lossless under AC conditions. These AC losses are due to a hysteristic characteristic of type II superconductors which is the type of conductor that is typically used in practical devices. This hysteristic characteristic is a result of flux pinning which causes the superconductor which has just experienced a cycle under AC conditions to not return to its original state, resulting in electromagnetic energy loss in its conversion to heat which is dissipated in the superconductor. This is the AC hysteresis loss. For practical application of high-$T_c$ (critical temperature) superconductors, it is desirable to minimize these AC losses. There is also an economic incentive to operate any superconductor device as close as possible to its critical current so that the superconductor's volume can be reduced, which translates into a cost reduction for the device itself. Therefore, reducing AC losses is important in the operation of any superconducting device, where the device may be incorporated in various components such as transmission cables, motors, generators and FCLs.

The previously described SSCR device is not the only configuration that can be used in the aforementioned electrical components. For example, an SSCR wherein the copper coil is disposed inside, rather than outside, of the superconductor tube will operate equally as well as a FCL. In this case, the applied magnetic field generated by the current in the copper coil penetrates the superconductor tube from the inside radius towards the outside radius as the current is increased in the copper coil. The superconductor does not have to be a cylindrical tube, as it can take the form of plural superconductor rings stacked together with or without spacing between adjacent rings. One approach to the design of a SSCR is disclosed in U.S. Pat. No. 5,892,644 wherein first and second magnetically opposed, parallel connected copper coils are wound on a common ferromagnetic core. Another approach to a SSCR used in a fault detection and current control circuit is disclosed in U.S. patent application Ser. No. 10/015,373, wherein a SSCR in a secondary circuit is used to control current in a primary circuit such as in an electrical distribution system, where the SSCR has a variable impedance or is used in combination with a variable current source.

The present invention reduces AC losses in an SSCR used as a FCL by employing an innovative winding of the SSCR's copper coil. In the inventive SSCR, a copper coil is wound both inside and outside of the superconducting tube, or rings, with the outside and inside coils electrically connected in series and further connected to the circuit being protected from a fault condition. During normal operation, AC losses are smaller than either externally or internally wound coils having an equivalent number of turns. In a fault condition, the applied magnetic field penetrates the superconducting coil simultaneously both from inside and outside the superconducting tube, or rings, for substantially increasing the impedance in the circuit and limiting the fault current.

OBJECTS AND SUMMARY OF THE INVENTION

Accordingly, it is an object of the present invention to provide an arrangement for reliably and economically reducing AC losses in an electrical transmission/distribution system which occur under continuous normal operating conditions.

It is another object of the present invention to provide a fault current limiter for automatically limiting the fault current in a power transmission or distribution system in the event of a fault condition for protecting system components and then automatically returning the system to normal operation following removal of the fault.

Yet another object of the present invention is to provide a combination of a ferromagnetic core, a pair of electrically coupled copper conductors, and a superconductor device in a super conducting shielded core reactor (SSCR) for limiting AC fault currents in an electrical transmission/distribution system which allows for operating the superconducting device at or near its critical current and thus reducing its size as well as the cost of the SSCR.

A further object of the present invention is to facilitate the use of superconducting devices both technologically and economically in SSCR fault current limiters.

The present invention contemplates an arrangement for reducing AC losses in an SSCR used as a fault current limiter in an electrical transmission/distribution system such as operated by an electrical utility. The innovative SSCR includes a ferromagnetic core around a portion of which is wound a copper coil. Rather than winding the copper coil either on the inside or outside of the superconductor, which may be in the form of a tube or plural spaced rings arranged in a stacked array, copper coils are disposed both inside and outside of the superconductor, where the inside and outside coils are connected in series and are further coupled to the circuit being protected. This arrangement causes the applied magnetic field to penetrate the superconductor tube/rings simultaneously from both inside and outside the tube/rings under fault conditions. During normal operation, the AC losses of the inventive SSCR device are smaller than either for an externally wound or internally wound copper coil having an equivalent number of turns. The AC losses are reduced by the present invention because the AC hysteresis of the superconductor is proportional to the cube of the amplitude of the applied magnetic field. For example, if a conventional SSCR with a total number of turns N for a copper coil disposed either inside or outside of the superconducting tube has an AC loss of 1, an SSCR arrangement in accordance with the present invention having an outside coil with N/2 turns and an inside coil with N/2 turns, the AC losses for the latter configuration are only ¼ the losses of the conventional SSCR. In addition to assuming the form of a cylindrical tube, the SSCR may also be in the form of stacked rings, with or without spacing between adjacent rings.

BRIEF DESCRIPTION OF THE DRAWING

The appended claims set forth those novel features which characterize the invention. However, the invention itself, as well as further objects and advantages thereof, will best be understood by reference to the following detailed description of a preferred embodiment taken in conjunction with the accompanying drawing which is a simplified combined block and schematic diagram shown partially in section of a superconducting shielded core reactor with reduced AC losses in accordance with the present invention.

DETAILED DESCRIPTION OF THE PREFERRED EMBODIMENTS

Referring to the figure, there is shown a simplified combined schematic and block diagram shown partially in section of a superconducting shielded core reactor (SSCR) 10 in accordance with one embodiment of the present invention. SSCR 10 is connected to an electric power transmission/distribution circuit 22 which includes an AC voltage source 20. The electric power transmission/distribution circuit 22 carries an alternating current I and is typical of those used by electric utilities for transmitting and distributing electric power to a large number of users.

SSCR 10 includes a ferromagnetic core 12 typically comprised of iron or steel. Ferromagnetic core 12 is shown as a closed core, but does not necessarily have to be of a closed configuration and may also be open with an air gap. The ferromagnetic core 12, or at least a portion of the core in the case of a closed core as shown in the figure, is disposed within a superconductor which may be in the form of an elongated tube or plural spaced rings as shown in the figure. More specifically, in the embodiment shown in the figure the superconductor 14 is in the form of first and second rings 14a and 14b each disposed about a respective spaced portion of the ferromagnetic core 12. The superconductor may also be in the form of a single elongated tube disposed about a portion of the ferromagnetic core 12 such as extending between the first and second superconducting rings 14a and 14b shown in the figure. SSCR 10 further includes an inner copper coil 16 and an outer copper coil 18. The inner and outer copper coils 16, 18 are connected in series and are further electrically coupled to the electric power transmission/distribution circuit 22. Each of the inner and outer copper coils 16, 18 is further wound around a portion of the ferromagnetic core 12. The inner copper coil 16 is wound around a portion of the ferromagnetic core 12 in a manner so that it is disposed between the first and second superconducting rings 14a and 14b which are also disposed about a portion of the ferromagnetic core. The outer copper coil 18 is disposed outside of the first and second superconducting rings 14a, 14b and is wound around each of these superconducting rings. As described above, each of the inner and outer copper coils 16, 18 is further wound around a portion of the ferromagnetic core 12. An electric current in the windings of the inner and outer copper coils 16, 18 produces a first electromagnetic field. An electric current in the first and second superconducting rings 14a, 14b produces a second electromagnetic field that is equal and opposite to that generated by the two copper coils. The result is that the current within the copper coils 16, 18 is invisible to the ferromagnetic core 12. During normal operation, the impedance within circuit 22 including the inner and outer copper coils 16, 18 is maintained at a low value. During a fault, the current in the first and second copper coils 16, 18 produces a very large spike which exceeds the shielding capabilities of the first and second superconducting rings 14a, 14b giving rise to a very large resistance and high impedance in the power transmission/distribution circuit 22 resulting in a limited fault current. When the spike dissipates, the electric power transmission/distribution circuit 22 returns to normal operation without the need for outside intervention, such as the resetting of a fuse or circuit breaker. This automatic reset feature is a major advantage of the SSCR approach to power transmission/distribution circuit shutdown and control.

By positioning the copper coils 16 and 18 respectively within and outside of the first and second superconducting rings 14a, 14b, the magnetic field produced by the current within these coils penetrates the superconductor rings simultaneously from both inside and outside of the rings in a fault condition. The large current within the inner and outer copper coils 16, 18 in a fault condition exceeds the shielding capability of the first and second superconducting rings 14a, 14b resulting in a sudden, substantial increase in the impedance within circuit 22 because the ferromagnetic core 12 is no longer shielded from the copper coils by the superconducting rings. During normal operation, the AC losses of the SSCR 10 are less than if the coil where either externally wound or internally wound with an equivalent number of turns with respect to the superconducting rings. The AC losses are reduced by using the inventors' arrangement of the inner and outer copper coils 16, 18 because the AC hysteresis of the superconducting rings 14a, 14b is proportional to the cube of the amplitude of the applied magnetic field. For example, if a conventional SSCR has a total number of turns of N for a copper coil disposed either inside or outside of the superconducting rings or tube, and the SSCR arrangement of the present invention has an outside copper coil with N/2 turns and an inside copper coil with N/2 turns, it can be shown that the AC losses for the inventive approach using outside and inside coils is only ¼ that of the single coil (either outside or inside) case.

There has thus been disclosed a SSCR for use as a FCL in an electric power transmission/distribution system that functions as a passive means for protecting components in the transmission/distribution system in the event of a fault condition such as a short caused by lightning. The inventive SSCR includes a ferromagnetic core having a superconductor disposed about a portion of the core, where the superconductor may take the form of an elongated tube or plural spaced rings disposed along a portion of the core. Also wound around the core are first and second copper coils which are connected in circuit with the electrical transmission/distribution system for which fault protection is being provided. The first and second copper coils are connected in series, or may be formed from a single conductor, and are respectively disposed inside and outside of the superconductor arrangement thus allowing the applied magnetic field to penetrate the superconductor tube/rings simultaneously from both inside and outside of the tube/ring arrangement. Because superconductor AC hysteresis is proportional to the cube of the amplitude of the applied magnetic field, AC losses can be significantly reduced under continuous normal operation, as well as under a fault condition, over that currently available. For example, if a conventional SSCR has a total number of N turns for the copper coil (either inside or outside of the superconductor tube/ring arrangement) and the proposed SSCR has an outside coil with N/2 turns and an inside coil with N/2 turns it can be shown that the AC loss for the latter is ¼ of that of the former. The superconductor itself may be a coil which closes on itself. The superconductor may be either a high- or low-$T_c$ material and is cooled below its critical temperature by conventional means such as cryogenic liquids or cryocoolers. The inside and outside copper coils, as well as the ferromagnetic core, can be either at room temperature or cooled to cryogenic temperatures. The inside and outside conductive coils may also be superconductor coils cooled to below their critical temperature(s). The ferromagnetic core may be comprised of iron or steel and has a closed configuration or may be open and include an air gap.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. A superconducting shielded core reactor (SSCR) in a circuit for limiting fault current under fault conditions and for reducing AC losses in a superconductor in the SSCR under continuous normal operating conditions, said SSCR comprising:
    a ferromagnetic core;
    series connected first and second conductive coils electrically coupled to the circuit and magnetically coupled to said ferromagnetic core; and
    a superconducting arrangement magnetically coupled to said ferromagnetic core and said first and second conductive coils, wherein an AC current in said first and second conductive coils produces a first magnetic field and wherein said first magnetic field gives rise to a second opposed magnetic field in said superconducting arrangement, and wherein said first and second magnetic fields cancel each other under normal operating conditions, and wherein said first magnetic field exceeds said second magnetic field in a fault condition, with said ferromagnetic core producing a large impedance in said first and second conductive coils for limiting AC current in the circuit under a fault condition, and wherein said first and second conductive coils direct respective magnetic fields on the inside and outside, respectively, of said superconducting arrangement.

2. The SSCR of claim 1 wherein said superconducting arrangement comprises a superconducting tube disposed about a portion of said ferromagnetic core.

3. The SSCR of claim 1 wherein said superconducting arrangement comprises plural superconducting rings each disposed about said ferromagnetic core and disposed in a spaced manner along a portion of said ferromagnetic core.

4. The SSCR of claim 3 wherein said first conductive coil is disposed intermediate pairs of adjacent superconducting rings and said second conductive coil is disposed about all of said superconducting rings.

5. The SSCR of claim 1 wherein said first and second conductive coils form a single conductor.

6. The SSCR of claim 1 wherein said first and second conductive coils are comprised of copper.

7. The SSCR of claim 1 wherein said ferromagnetic core is closed.

8. The SSCR of claim 1 wherein said ferromagnetic core is open and includes an air gap.

9. The SSCR of claim 1 wherein said circuit is in an electric power transmission and distribution network.

10. Apparatus for limiting fault current under fault conditions in a circuit and for reducing AC losses in a superconducting shielded core reaction (SSCR) in said circuit under continuous normal operating conditions, said apparatus comprising:
    series connected first and second conductive coils electrically coupled to the circuit and carrying a first AC current, wherein said first and second coils respectively generate first and second magnetic fluxes;
    a ferromagnetic core magnetically coupled to first and second conductive coils and responsive to said first and second magnetic fluxes; and
    a superconducting arrangement in said SSCR magnetically coupled to said ferromagnetic core and said first and second conductive coils and carrying a second AC current induced by said first AC current, wherein said second AC current produces a third magnetic flux, wherein said third magnetic flux cancels out said first and second magnetic fluxes under continuous normal operating conditions for reducing AC losses, and wherein said first and second magnetic fluxes exceed said third flux under fault conditions and said ferromagnetic core introduces a large impedance in said first and second coils for limiting a fault current in the circuit, and wherein said first and second magnetic fluxes are respectively applied to the inside and outside of said superconducting arrangement.

11. The apparatus of claim 10 wherein said superconducting arrangement is in the form of a superconducting tube disposed about at least a portion of said ferromagnetic core.

12. The apparatus of claim 11 wherein said ferromagnetic core is closed or open.

13. The apparatus of claim 10 wherein said superconducting arrangement includes a type II superconductor.

14. The apparatus of claim 10 wherein said superconducting arrangement is in the form of plural superconducting rings disposed about said ferromagnetic core and arranged in a spaced manner along at least a portion of said ferromagnetic core.

15. The apparatus of claim 14 wherein said first conductive coil is disposed intermediate pairs of adjacent superconducting rings and said second conductive coil is disposed about all of said superconducting rings.

16. The apparatus of claim 10 wherein said first and second conductive coils form a single conductor.

17. The apparatus of claim 10 wherein said circuit is in an electrical power transmission and distribution network.

* * * * *